United States Patent
Bernal et al.

(10) Patent No.: US 9,418,426 B1
(45) Date of Patent: Aug. 16, 2016

(54) MODEL-LESS BACKGROUND ESTIMATION FOR FOREGROUND DETECTION IN VIDEO SEQUENCES

(71) Applicant: Xerox Corporation, Norwalk, CT (US)

(72) Inventors: Edgar A. Bernal, Webster, NY (US); Qun Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 47 days.

(21) Appl. No.: 14/606,469

(22) Filed: Jan. 27, 2015

(51) Int. Cl.
  G06K 9/00 (2006.01)
  G06K 9/34 (2006.01)
  G06T 7/00 (2006.01)
  G06T 7/40 (2006.01)
  H04N 9/04 (2006.01)

(52) U.S. Cl.
  CPC ............ *G06T 7/0022* (2013.01); *G06T 7/0087* (2013.01); *G06T 7/0097* (2013.01); *G06T 7/408* (2013.01); *H04N 9/04* (2013.01); *G06T 2207/10016* (2013.01); *G06T 2207/10024* (2013.01); *G06T 2207/20032* (2013.01); *G06T 2207/20081* (2013.01); *G06T 2207/20144* (2013.01); *G06T 2207/30232* (2013.01)

(58) Field of Classification Search
  USPC ................................. 382/103, 164
  See application file for complete search history.

(56) References Cited

U.S. PATENT DOCUMENTS

| | | | | |
|---|---|---|---|---|
| 6,535,633 B1* | 3/2003 | Schweid | ............... | G06T 7/0081 358/515 |
| 6,661,918 B1* | 12/2003 | Gordon | .................... | G06K 9/38 382/164 |
| 7,221,794 B1 | 5/2007 | Gloudemans, II et al. | | |
| 7,359,552 B2 | 4/2008 | Porikli | | |
| 7,868,922 B2 | 1/2011 | Ciuc et al. | | |
| 8,611,593 B2 | 12/2013 | Chen et al. | | |
| 8,712,149 B2 | 4/2014 | Pai et al. | | |
| 8,837,823 B2 | 9/2014 | Partis et al. | | |
| 8,934,669 B2* | 1/2015 | Yang | .................. | G06K 9/00798 382/103 |
| 2007/0237393 A1* | 10/2007 | Zhang | ...................... | G06K 9/38 382/173 |
| 2008/0181499 A1* | 7/2008 | Yang | ...................... | G06T 7/0083 382/174 |
| 2010/0215256 A1* | 8/2010 | Wang | ....................... | G06K 9/34 382/159 |
| 2011/0135147 A1* | 6/2011 | Eswara | ................. | G06T 7/0081 382/103 |
| 2012/0176399 A1* | 7/2012 | Whitehead | .............. | G06T 5/008 345/589 |

(Continued)

OTHER PUBLICATIONS

Hernandez-Lopez et al. Detecting objects using color and depth segmentation with kinect sensor, sciver sciencedirect, 2012, pp. 196-204.*

(Continued)

*Primary Examiner* — John Strege
(74) *Attorney, Agent, or Firm* — Gibb & Riley, LLC

(57) ABSTRACT

A camera outputs video as a sequence of video frames having pixel values in a first (e.g., relatively low dimensional) color space, where the first color space has a first number of channels. An image-processing device maps the video frames to a second (e.g., relatively higher dimensional) color representation of video frames. The mapping causes the second color representation of video frames to have a greater number of channels relative to the first number of channels. The image-processing device extracts a second color representation of a background frame of the scene. The image-processing device can then detect foreground objects in a current frame of the second color representation of video frames by comparing the current frame with the second color representation of a background frame. The image-processing device then outputs an identification of the foreground objects in the current frame of the video.

20 Claims, 11 Drawing Sheets

(56) References Cited

U.S. PATENT DOCUMENTS

| | | | |
|---|---|---|---|
| 2013/0084006 A1 | 4/2013 | Zhang et al. | |
| 2013/0129205 A1* | 5/2013 | Wang | G06K 9/6278 382/164 |
| 2015/0054974 A1* | 2/2015 | Ehmann | H04N 5/2226 348/218.1 |
| 2015/0109326 A1* | 4/2015 | Romano | G09G 5/18 345/618 |
| 2015/0269739 A1* | 9/2015 | Ho | G06T 7/0081 382/164 |

OTHER PUBLICATIONS

Stauffer, C. and Grimson. W., "Adaptive background mixture models for real-time tracking," CVPR 1999, pp. 1-7.

Van de Weijer, J. et al, "Learning Color Names for Real-World Applications," IEEE Trans. on Image Processing, vol. 18(7), Jul. 2009, pp. 1512-1523.

Danelljan, M. et al, "Adaptive Color Attributes for Real-Time Visual Tracking," CVPR 2014, pp. 1-8.

\* cited by examiner

MODEL-LESS BACKGROUND ESTIMATION FOR FOREGROUND DETECTION IN VIDEO SEQUENCES

BACKGROUND

Systems and methods herein generally relate to processing items in video frames obtained using a camera system, and more particularly to image processors that discriminate between background and foreground items within such video frames, without using substantial background modeling processes.

Video-based detection of moving and foreground objects in video acquired by stationary cameras is a core computer vision task. Temporal differencing of video frames is often used to detect objects in motion, but fails to detect slow-moving (relative to frame rate) or stationary objects. Background estimation and subtraction, on the other hand, can detect both moving and stationary foreground objects, but is typically more computationally expensive (both in terms of computing and memory resources) than frame differencing. Background estimation techniques construct and maintain statistical models describing background pixel behavior. According to this approach, a historical statistical model (e.g., a parametric density model such as a Gaussian Mixture Model (GMM), or a non-parametric density model such as a kernel-based estimate) for each pixel is constructed and updated continuously with each incoming frame at a rate controlled by a predetermined learning rate factor. Foreground detection is performed by determining a measure of fit of each pixel value in the incoming frame relative to its constructed statistical model: pixels that do not fit their corresponding background model are considered foreground pixels.

This approach has numerous limitations, including the requirement for computational and storage resources, the fact that the model takes time to converge, and the fact that there are many parameters to tune (e.g., the learning rate, the goodness-of-fit threshold, the number of components in each mixture model, etc.). Once a set of parameters is chosen, the latitude of scenarios supported by the model-based methods is limited; for example, too slow a learning rate would mean that the background estimate cannot adapt quickly enough to fast changes in the appearance of the scene; conversely, too fast a learning rate would cause objects that stay stationary for long periods to be absorbed into the background estimate.

SUMMARY

An exemplary system herein includes an image-processing device and a camera operatively (meaning directly or indirectly) connected to the image-processing device. The camera is in a fixed position and outputs video of a scene being monitored. The camera outputs the video as a sequence of video frames have pixel values in a first (e.g., relatively low dimensional) color space, where the first color space has a first number of bits per channel.

The image-processing device maps the video frames to a second (e.g., relatively higher dimensional) color representation of video frames. The mapping causes the second color representation of video frames to have a relatively greater number of channels and possibly a relatively different number of bits per channel. The mapping causes the second color representation of video frames to be more photometrically invariant to illumination conditions and more color discriminative relative to the first color space.

The first color space can be, for example, 3 or 4 dimensional color spaces (e.g., RGB, YCbCr, YUV, Lab, CMYK, Luv, etc.) while the second color representation can have much higher dimensions, such as 11-dimensions (i.e., pixel values in the second color representation of video frames are represented by vectors have a greater vector length relative to pixel values in the first color space). Thus, the second color representation of video frames have more color discrimination relative to the video frames have pixel values in the first color space.

The image-processing device extracts a second color representation of a background frame of the scene from at least one of the second color representation of video frames. For example, the image-processing device can extract the second color representation of a background frame by: obtaining a frame of the second color representation of video frames when no foreground objects are present; filtering moving objects from the second color representation of video frames by identifying the moving objects as ones that change locations in adjacent frames of the second color representation of video frames; temporally averaging a number of incoming frames; or temporally median filtering a number of incoming frames.

The image-processing device can then detect foreground objects in a current frame of the second color representation of video frames by comparing the current frame with the second color representation of a background frame. The image-processing device then outputs an identification of the foreground objects in the current frame of the video.

Additionally, the image-processing device can generate a third color representation of the background frame and the video frames. The third color representation has a smaller number of channels and/or a smaller bit depth relative to the second color representation, where bit depth represents the number of bits per channel. The third color representation can be obtained from the second color representation via a dimensionality reduction technique, and the third color representation largely preserves photometric invariance and discriminative attributes of the second color representation.

An exemplary method herein captures and outputs video of a scene being monitored using a camera in a fixed position. The video is output from the camera as a sequence of video frames that have pixel values in a first color space (e.g., RGB, YCbCr, YUV, Lab, CMYK and Luv) where the first color space has a first number of bits per channel. Also, this exemplary method maps the video frames to second color representation of video frames using an image-processing device operatively connected to the camera. Also, the mapping process can transform the pixel values in the first color space to be more photometrically invariant to illumination conditions.

The mapping process transforms the pixel values in the first color space from the first number of bits per channel to a greater number of channels and, possibly a different number of bits per channel. Thus, the mapping process produces pixel values in the second color representation of video frames to be represented by vectors have a greater vector length relative to pixel values in the first color space. This, therefore, causes the second color representation of video frames to have more color discrimination relative to the video frames have pixel values in the first color space.

This exemplary method also extracts a second color representation of a background frame of the scene from at least one of the second color representation of video frames (using the image-processing device). More specifically, the process of extracting the second color representation of a background frame can be performed by, for example, obtaining a frame of the second color representation of video frames when no foreground objects are present, filtering moving objects from the second color representation of video frames by identifying the moving objects as ones that change locations in adjacent frames of the second color representation of video frames, temporally averaging a number of incoming frames, temporally median filtering a number of incoming frames, etc.

Then, this method can detect foreground objects in a current frame of the second color representation of video frames by comparing the current frame with the second color representation of a background frame, again using the image-processing device. Finally, this exemplary method outputs an identification of the foreground objects in the current frame of the video from the image-processing device.

Additionally, this exemplary method can generate a third color representation of the background frame and the video frames. The third color representation has a smaller number of channels and/or a smaller bit depth relative to the second color representation. The third color representation can be obtained via a dimensionality reduction technique, and the third color representation largely preserves photometric invariance and discriminative attributes of the second color representation.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
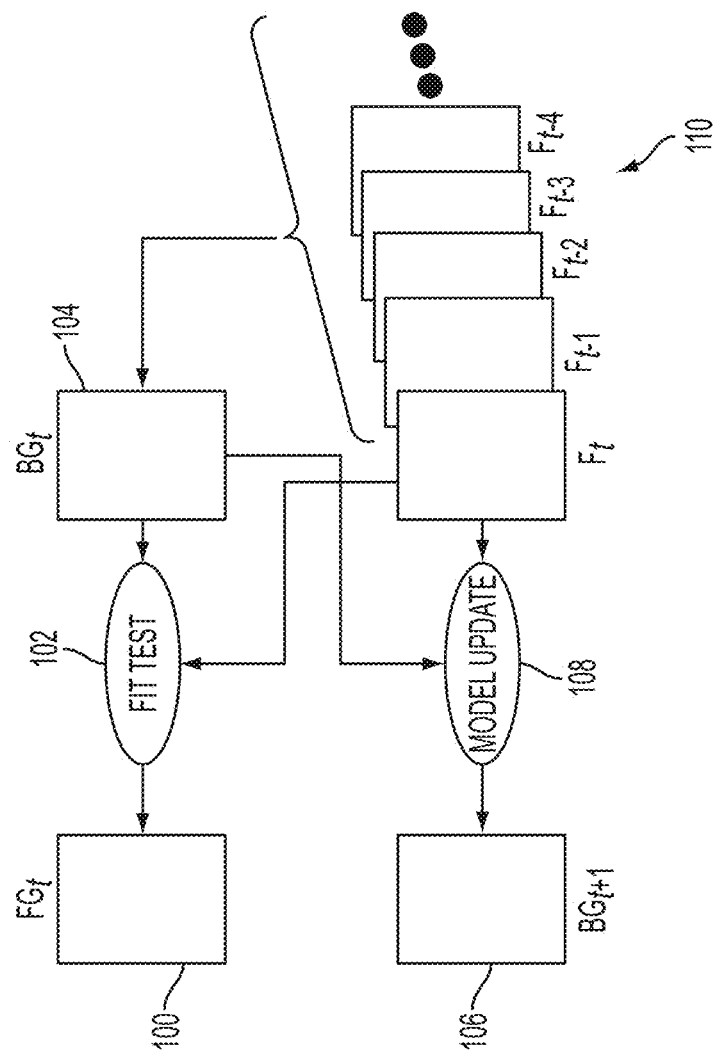
FIG. 1 is a conceptual chart of an estimation/updating of a model-based foreground detection system.

As mentioned above, conventional systems that use modeling to differentiate background and foreground objects in video frames suffer from many limitations. Therefore, the systems and methods herein do away with the added computational and storage requirements of traditional model-based approaches and possess a smaller number of parameters to be tuned, which results in increased robustness across a wider range of scenarios. Also, the model-less systems and methods herein do not require any convergence time.

The systems and methods herein therefore provide model-less background estimation for foreground detection that does away with the initialization period and the added computational and storage requirements of traditional model-based approaches, and possesses a smaller number of parameters to be tuned, all of which results in increased robustness across a wider range of scenarios. Note that in this disclosure the words "model-less" and "unmodeled" are sometimes used interchangeably to define processes that do not using modeling processes. The systems and methods herein use a representation of the background image in a color space that is highly photometric invariant while at the same time being highly discriminative.

Foreground and moving object detection is usually a precursor of video-based object tracking, and, as such, is one of the fundamental technical problems in computer vision applications such as surveillance, traffic monitoring and traffic law enforcement, etc. Examples of implementations that rely on robust object tracking include video-based vehicle speed estimation, automated parking monitoring, and measuring total experience time in retail spaces. The methods and systems disclosed herein diverge from the traditional model-based approaches for background estimation and do not rely on model construction and maintenance.

One limitation of model-based approaches lies in the number of parameters that need to be tuned. For example, the choice for a learning rate involves a tradeoff between how fast the model is updated and the range of speed of motion that can be supported by the model. Specifically, too slow a learning rate would mean that the background estimate cannot adapt quickly enough to fast changes in the appearance of the scene (e.g., changes in lighting, weather, etc.); conversely, too fast a learning rate would cause objects that stay stationary for long periods (relative to frame rate and learning rate) to be absorbed into the background estimate. As another example, the choice for the number of components in each model involves a tradeoff between how adaptable the models are to changes in illumination and computational complexity, because a larger number of components increases adaptability and complexity at the same time. Unfortunately, too large a number of components in the model may lead to overfitting issues, where the appearance of objects in the scene other than those in the background may be represented in the model. Also, the choice for thresholding constant to binarize the output of the fit test involves a tradeoff between false positives and missed detections.

Another limitation of the model-based approaches lies in the memory and computational resources required to create, maintain (update) and store pixel-wise models. Yet another limitation is related to the time the model construction phase takes to converge (usually in the order of a few hundred to a few thousand frames).

FIG. 1 is a flowchart of a background estimation/updating and foreground detection process. Thus, FIG. 1 illustrates a model-based process for background estimation and updating, and foreground detection. Specifically, reference numeral 100 identifies a binary image, reference numeral 102 identifies a fit test process, reference numerals 104 and 106 identify background models, reference numeral 108 identifies a model update process, and reference numeral 110 identifies grayscale/color images that are part of a video sequence. In the logic of FIG. 1 conceptually: $F_i$ denotes the i-th video frame (grayscale or color), where i represents a temporal index; $BG_i$ denotes the i-th background model (array of pixel-wise statistical models) used for foreground detection in conjunction with frame $F_i$ (this is the model available before an update occurs based on the newly incoming pixel samples in $F_i$); $FG_i$ denotes the i-th foreground binary mask obtained via comparison between $BG_i$ and $F_i$; $BG_{i+1}$ denotes the (i+1)-th background model obtained by updating the pixel-wise background models in $BG_i$ with the pixel values in $F_i$; lastly, $FG_{i+1}$ will subsequently be determined via comparison between $BG_{i+1}$ and frame $F_{i+1}$. Note that frames $F_1$ through $F_t$ are involved in the estimation of background model $BG_{t+1}$.

The following in-depth discussion of the operation of model-based approaches is intended to convey the complexity and need for storage resources, as well as the need to fine-tune a range of parameters in model-based methods.

With respect to pixel modeling, statistical models for background estimation model the values of a pixel over time as the instantiations of a random variable with a given distribution. Background estimation is achieved by estimating the parameters of the distributions that accurately describe the historical behavior of pixel values for every pixel in the scene. Specifically, at frame n, what is known about a particular pixel located at spatial coordinates (i,j) is the history of its values $\{X_1, X_2, \ldots, X_n\} = \{I(i,j,m), 1 \leq m \leq n\}$ where I is the image sequence or video frame sequence, (i,j) are the spatial pixel indices and m is the temporal image frame index.

While the historical behavior can be described with different statistical models including parametric models that assume an underlying distribution and estimate the relevant parameters, and non-parametric models such as kernel-based density estimation approaches, an algorithm can be implemented in terms of Gaussian mixture models, and note that it is equally applicable to other online modeling approaches. One can model the recent history of behavior of values of each pixel as a mixture of K Gaussian distributions, so that the probability of observing the current value is $P(X_t) = \sum_{i=1}^{K} w_{it} \eta(X_t, \mu_{it}, \Sigma_{it})$ where $w_{it}$ is an estimate of the weight of the i-th Gaussian component in the mixture at time t, $\mu_{it}$ is the mean value of the i-th Gaussian component in the mixture at time t, $\Sigma_{it}$ is the covariance matrix of the i-th Gaussian component in the mixture at time t, and $\eta(\cdot)$ is the Gaussian probability density function. Sometimes a reasonable assumption is for the different color channels to be uncorrelated, in which case $\Sigma_{it} = \sigma_{it} I$.

Pixel modeling is usually conducted during the initialization/training phase of the background model. To this end, the first N frames (usually N~100 in practice) are used to train the background model. A background model is said to have been initialized once the parameters that best describe the mixture of Gaussians (weights, mean vectors and covariance matrices for each Gaussian component) for every pixel are determined. For simplicity, the following omits the initialization/training phase of the background model from the description of the system and assumes the background model has been initialized upon the beginning of the foreground detection process.

With respect to foreground pixel detection, foreground detection is performed by determining a measure of fit of each pixel value in the incoming frame relative to its constructed statistical model (e.g., item 102). In one example, as a new frame comes in, every pixel value in the frame is checked against its respective mixture model so that a pixel is deemed to be a background pixel if it is located within T=3 standard deviations of the mean of any of the K components. Use of other values for T or membership/fit tests to determine pixel membership (e.g., maximum likelihood) is possible.

With respect to model updating (e.g., item 108), if none of the K components in the distribution match the current pixel value according to the membership test described above, the pixel may be considered as a foreground pixel, and, additionally, the least probable component in the mixture may be replaced with a component with mean equal to the incoming pixel value, some arbitrarily high variance, and a small weighting factor, the two latter statements reflecting the lack of confidence in the newly added component.

If, on the other hand, there is a component in the distribution that matches the pixel, the weights of the distributions can be adjusted according to: $w_{i(t+1)} = (1-\alpha) w_{it} + \alpha M_{it}$ where $\alpha$ is the learning or update rate and $M_{it}$ is an indicator variable equaling 0 for every component except the matching one (in which case $M_{it}=1$), so that only the weight factor for the matching distribution is updated. Similarly, only the mean and standard deviation/covariance estimates for matching components are updated according to:

$$\mu_{t+1} = (1-\rho)\mu_t + \rho X_t$$

$$\sigma_{t+1}^2 = (1-\rho)\sigma_t^2 + \rho(X_t - \mu_{t+1})^T(X_t - \mu_{t+1})$$

where $X_t$ is the value of the incoming pixel and $\rho = \alpha \eta(X_t | \mu_k, \sigma_k^2)$ is the learning rate for the parameters of the matching component of the distribution, k.

To avoid such computational and storage requirements associated with model-based systems, the systems and methods herein provide model-less (unmodeled) background estimation for foreground detection that does away with the added computational and storage requirements of traditional model-based approaches and possesses a smaller number of parameters to be tuned, which results in increased robustness across a wider range of scenarios. The systems and methods herein rely on the representation of the background image in a color space that is highly photometric invariant, while at the same time being highly discriminative.

Figure 2:
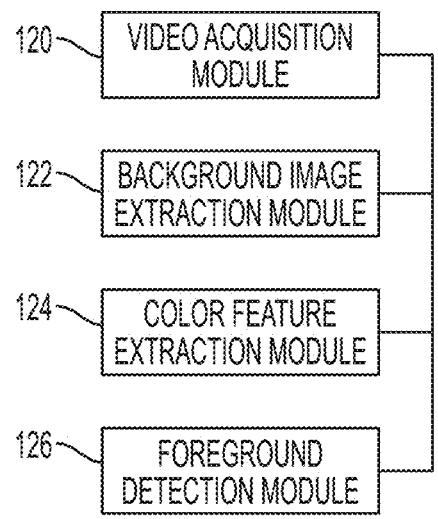
FIG. 2 is a conceptual chart of modules provided by systems and methods herein.

FIG. 2 is a conceptual chart of modules provided by systems and methods herein, and such conceptual modules include a video acquisition module 120, which provides the incoming video frames either via real-time acquisition with a camera or by reading videos stored offline; a background image extraction module 122, which extracts an image from the video feed with no foreground objects from the video feed; a color feature extraction module 124, which takes as input an image (e.g., a video frame) and computes its representation in the desired color feature space; and a foreground detection module 126, which compares the color feature representation of the background image and that of each incoming video frame, and outputs a binary mask indicating the location of foreground and moving objects.

Figure 3:
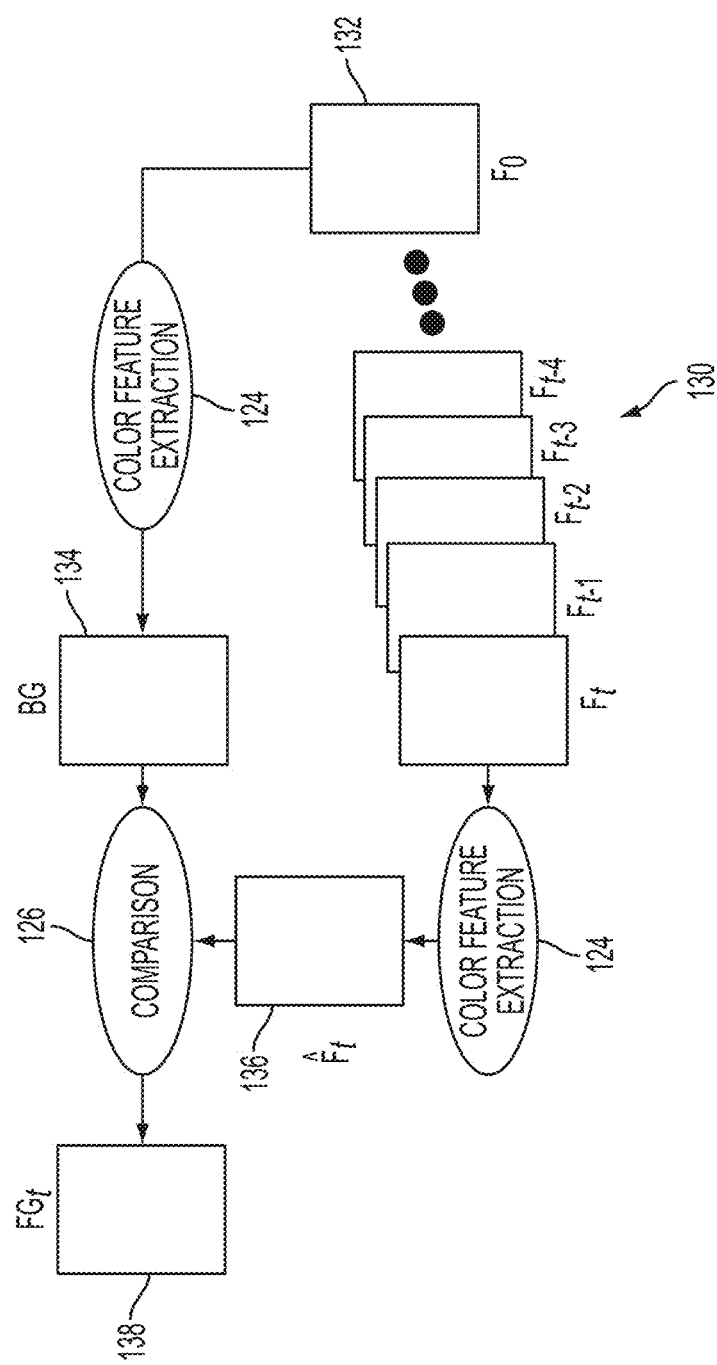
FIG. 3 is a block diagram illustrating processes carried out by systems and methods herein.

FIG. 3 is a block diagram illustrating processes carried out by systems and methods herein. The video acquisition module 120 (in FIG. 2) reads video frames $F_i$ (130); the background image extraction module 122 selects a frame 132 from the video 130 with no foreground objects (denoted by $F_0$ in the Figure); the color feature extraction module 124 performs color feature extraction tasks on both the extracted background 132 and incoming frames 130; and the foreground detection module 126 compares the color feature representations of the background 134 and the incoming frame 136 to produce a binary image representative of the foreground area 138. It can be seen from the diagram in FIG. 3 that the background representation is static and does not require updating or maintenance.

Figure 4:
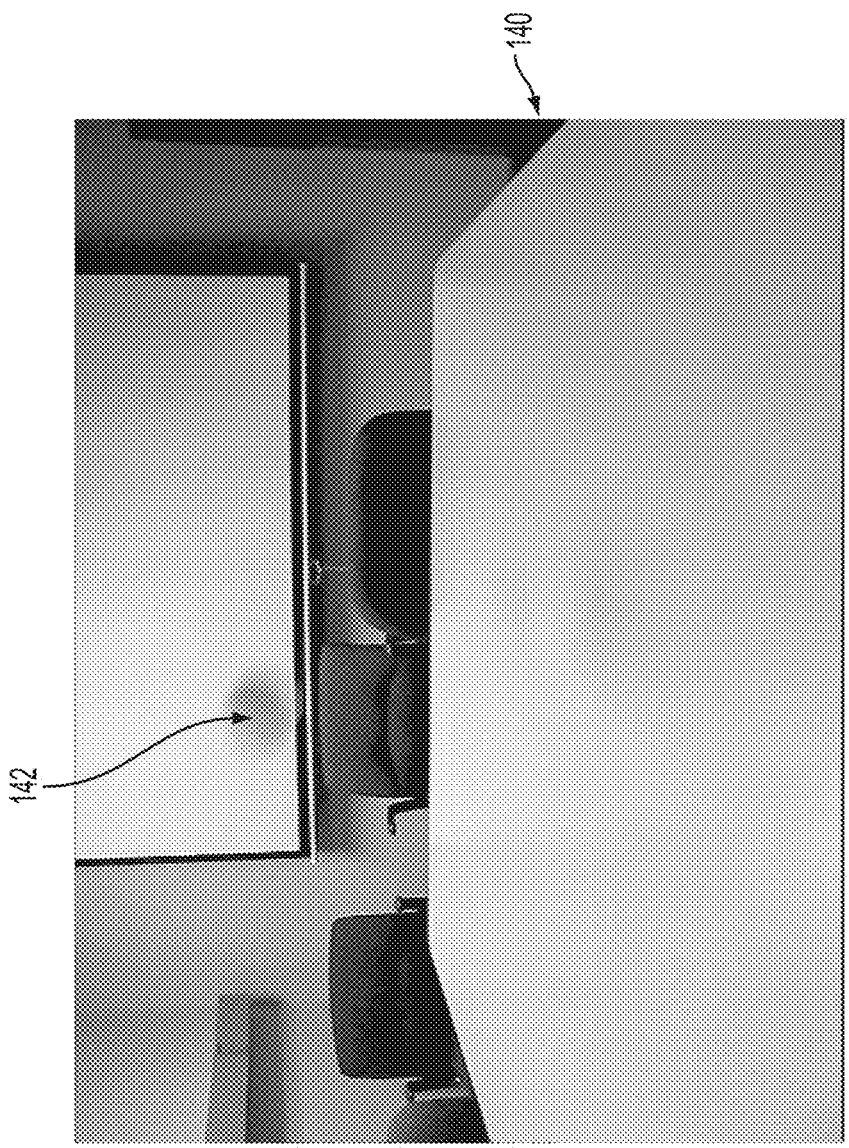
FIG. 4 is a sample video frame illustrating a conference room scene with a moving tennis ball.

In greater detail, the video acquisition module 120 can be fixed or stationary (usually a surveillance) camera acquiring video of the region of interest. Alternatively, stored video can be read from its storage medium. FIG. 4 is a sample video frame 140 obtained by the video acquisition module 120 illustrating a conference room scene with a moving tennis ball 142. As shown in FIG. 4, a tennis ball (foreground object 142) bounces around the scene being captured (the background comprises the room and stationary objects therein), while the illumination in the scene changes drastically at periodic intervals (lights are turned on and off to simulate drastic illumination changes encountered in real-life situations such as changes due to camera auto-gain or exposure parameters, fast-moving clouds, transit of illuminated objects across the scene, etc.)

Figure 5:
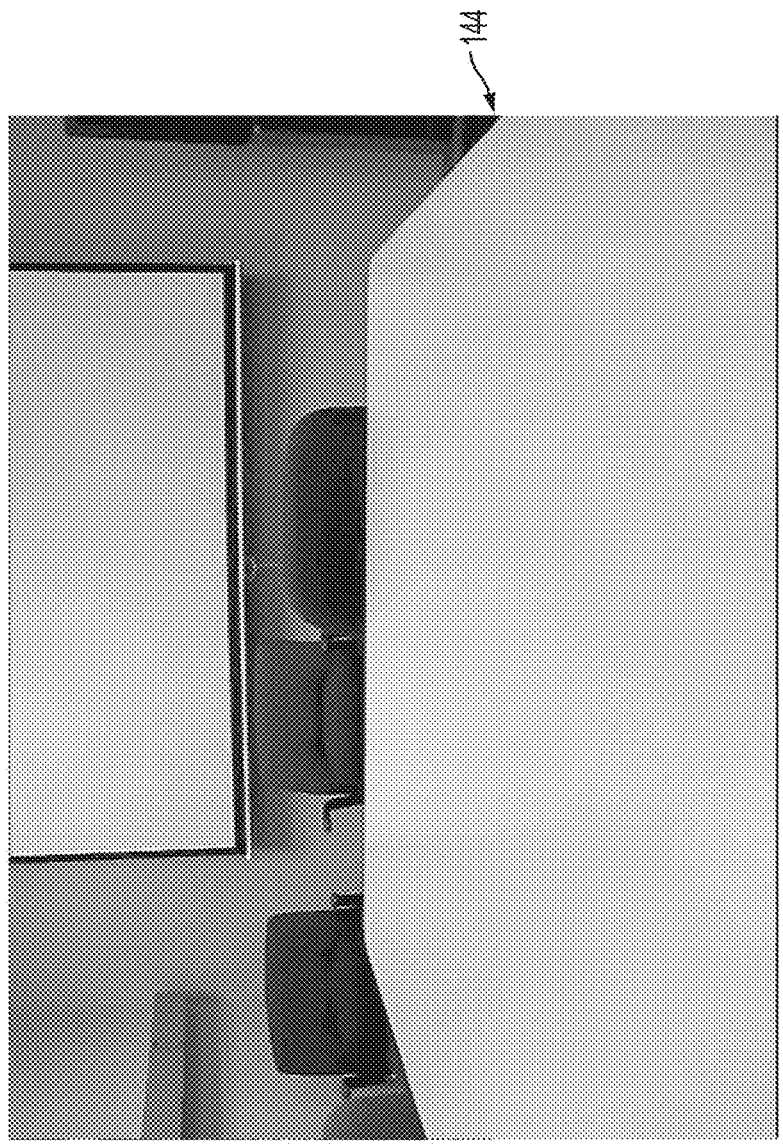
FIG. 5 shows a sample background image extracted by the background image extraction module.

The background image extraction module 122 extracts an image of the scene being monitored with no foreground objects from the video feed. This image can be extracted from a single frame (e.g., after camera installation, or every time the camera is moved), or can be automatically estimated from the incoming video (e.g., by temporally averaging or median filtering a number of incoming frames). Since a representation of the background image in the second color space is desired, the processing of the video frames to extract the background image can be performed in the first color space and the resulting background image then mapped to the second color space; alternatively, the processing of the incoming video frames can be performed directly from video frames in the second color space. FIG. 5 shows a sample background image 144 extracted by the background image extraction module 122. Other than the requirement that no foreground object be present in the frame chosen as a background image, no additional constraints are imposed.

The color feature space selected for performing the background subtraction is robust to a wide range of photometric conditions (e.g., illumination and changes thereof, as well as changes caused by variations in camera parameters such as auto-gain and exposure), so factors like time of day or weather conditions will not have an impact on the choice for a background image. For example, the color feature space is such that the color feature representation of a given scene taken on a sunny day closely matches that of the same scene taken on a rainy or cloudy day.

In addition to being photometrically invariant, the high-dimensional color feature space is also highly discriminative. This means that the representation of two objects in a scene with apparently similar colors, (e.g., two objects with two closely resembling shades of red) will be significantly different. Note that there is a tradeoff between how discriminative and how photometrically invariant a color space is. The highly discriminative and photometrically invariant color space used with the methods and systems herein strikes a good balance between photometric invariance and discriminability.

In one example, the color feature extraction module 124, uses high-dimensional color features to represent both the background image and the incoming video frames. The selected color feature space, in addition to being high-dimensional (in order to aid discriminability), is highly photometrically invariant, which means that a given color has similar representations in the feature space regardless of illumination conditions (varying illumination conditions are brought about by shadows, and changes in lighting and weather conditions, as well as changes in camera capture parameters.) One of the reasons why model-based background estimation algorithms are popular is because they are highly adaptable to changing illumination conditions. As stated, however, they have intrinsic limitations regarding how fast they can adapt to those changes; for example, shadows cast by a passing cloud will be detected initially as foreground, and may only be absorbed by the background model if the cloud is moving slowly enough, relative to the selected learning rate. By representing the background and foreground images in a color space that is illumination-independent, a static background representation can be maintained for as long as the configuration of the camera relative to the scene remains unchanged. In one example, if the use of a low-dimensional color space is desired, a mapping from the high-dimensional space to a low-dimensional space can be performed via dimensionality reduction techniques (e.g., linear dimensionality reduction techniques, such as principal component analysis or PCA and independent component analysis or ICA, non-linear dimensionality reduction techniques such as non-linear PCA and ICA, manifold learning, and principal curves, or quantization techniques such as scalar and vectorial quantization) provided the mapping largely preserves the features of the original space. The dimensionality reduction is such that the low-dimensional color space largely preserves most of the photometrically invariant and discriminative properties of the high-dimensional space.

The color feature extraction module 124 extracts high-dimensional color features by linearly mapping a color in the RGB or other low-dimensional color space to a high-dimensional space, which can, for example, be based on color names. Intuitively speaking, when colors that lie on a low-dimensional space (i.e., three-channel spaces such as RGB (red, green, blue), Lab (CIELAB (or L*a*b*), YUV (luma (Y') and chrominance (UV)), YCrCb (Y' is the luma component, and CB and CR are the blue-difference and red-difference chroma components), and four-channel spaces such as CMYK (cyan, magenta, yellow, black, etc.) are mapped to a high-dimensional space, their representation is sparse, which leads to good discriminability (i.e., a red object looks different than a blue object). For example, when the transformation is constructed taking into account human color naming, the mapping performed by the color feature extraction module 124 brings about added robustness to changes in color appearance due to variations in illumination (i.e., a red object is red regardless of whether it's sunny or cloudy; similarly, a red object looks different than a blue object regardless of illumination.) These two attributes give raise to photometric invariant and discriminative representations of colors.

The systems and methods herein use high-dimensional mapping that maps RGB or other low-dimensional color space to a relatively higher-dimensional space (e.g., an 11-dimension or 11-channel space) although other specific mappings are possible, as long as they satisfy the requirements described above. The transformation can be learned from labeled and uncalibrated real-world images with color names. These images can be obtained, for example, via search engine results corresponding to image sets resulting from color name search queries. The images will comprise a wide range of objects and scenes whose appearance more or less corresponds to the queried color; specifically, images retrieved via the query "black" will largely contain black scenes and objects acquired under varying illumination, camera pose, and other capture conditions. Probabilistic models that represent the color distribution of each of the query images can be constructed and used to learn the appearance of colors corresponding to color names. The learned model can be implemented in the form of a look-up table (LUT) that maps colors in the incoming color space (e.g., RGB, YCrCb, Luv, Lab, etc.) to a higher dimensional color space where each of the dimensions roughly corresponds to a color name. In more general examples, the mappings to a higher dimensional color space can be learned from labels other than color names, as long as the labels are uncorrelated.

As a background image is selected by the background extraction module 122, its high-dimensional color representation is computed and stored by the color feature extraction module 124. Similarly, as incoming frames are acquired and processed, their high-dimensional representation is computed by the color feature extraction module 124 and foreground detection is performed in the high-dimensional space by the foreground detection module 126.

Figure 6:
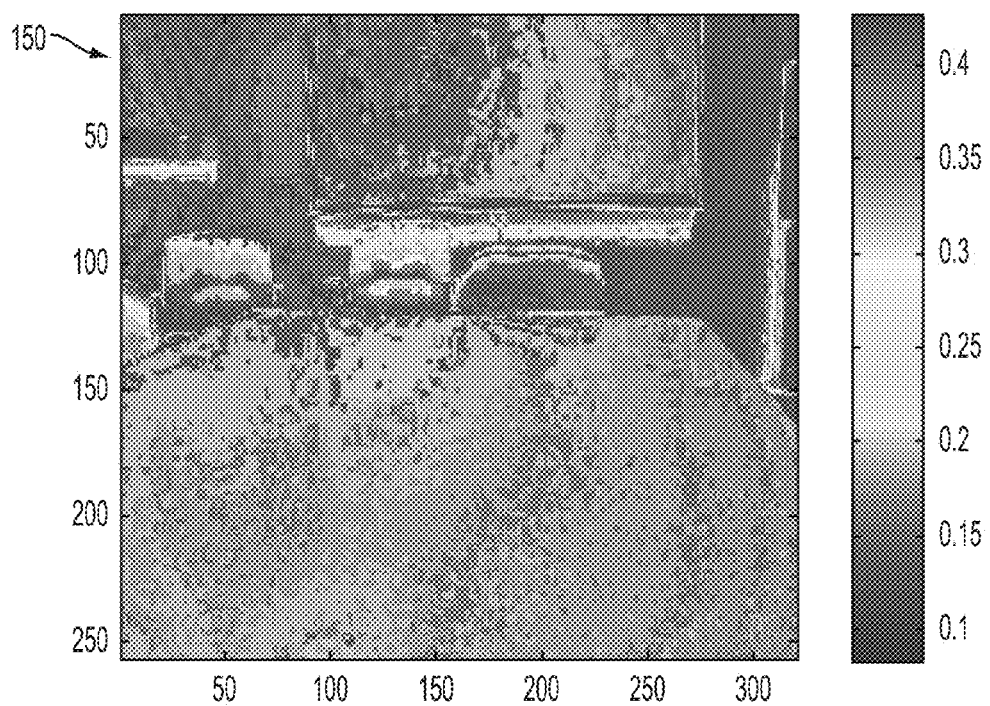
FIG. 6 illustrates mapping FIG. 5 to a higher-dimensional representation.

In one example, the color feature extraction module 124 performs mapping. Incoming three-channel RGB colors are quantized to 8 bits per channel, and then mapped to a 4 bit per channel, 11-dimensional color space via the use of a $256^3 \rightarrow 4^{11}$ LUT (although different bits per channel or bit depths and different dimensional color spaces are equally useful with the systems and methods herein, and the foregoing are merely examples). FIG. 6 illustrates the result of mapping performed by the color feature extraction module 124; and item 150 in FIG. 6 shows the pseudocolored pixel-wise 11-dimensional or 11-channel representation of the background image from FIG. 5. Intuitively, the mapping converts a densely populated low-dimensional color space into a sparsely populated high-dimensional color space because of the significant dimensionality disparities between both spaces. The sparsely populated high-dimensional space consists of groups of colors where variations of a given color due to different illuminations, shadows and object specularities are clustered together. The discriminative capabilities of the mapping are due to the fact that color representations of photometric variations of a given color are more tightly clustered than color representations of different colors.

Figure 7A:
FIGS. 7(a)-7(c) illustrate the foreground detection process performed by systems and methods herein.
Figure 7B:
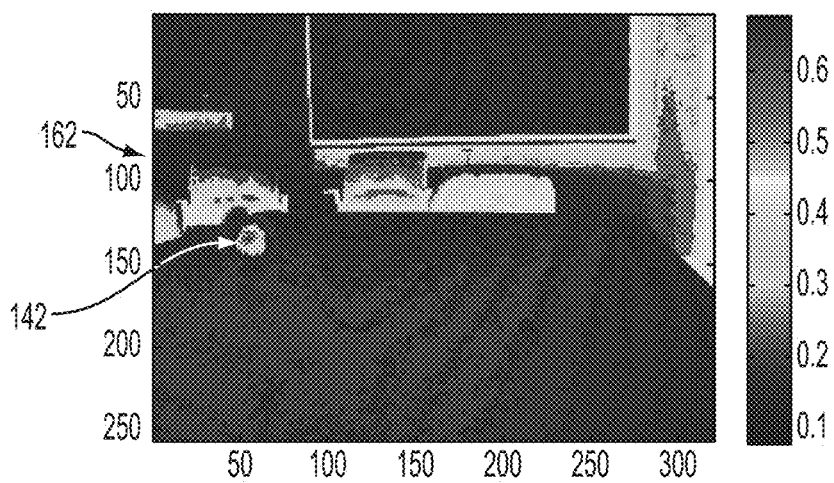
Figure 7C:
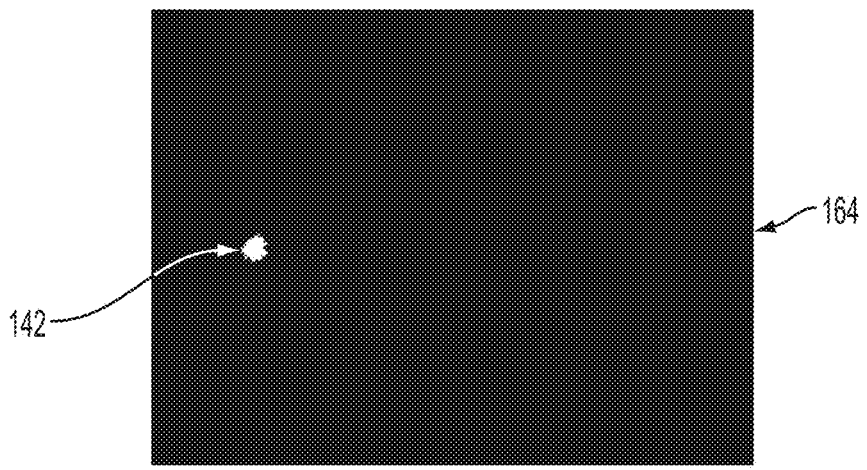

The foreground detection module 126 compares the color feature representations of the background (e.g., FIG. 6) and every incoming frame, and outputs a binary mask where active pixels are associated with foreground or moving objects. If high-dimensional pixel representations are interpreted as vectors in a high-dimensional space, the comparison can take the form of a pixel-wise vectorial distance computation. Alternatively, if pixel representations are interpreted as discrete distributions, divergence metrics can be used as a measure of similarity. Both approaches can be equivalently used by systems and methods herein (as are other similar approaches that measure similarities/dissimilarities between vectors). In any case, the resulting similarity number is thresholded (pixel values are compared to a threshold value to determine if they will be white or black in the image of the foreground objects) to produce a binary output. In one example, a simple pixel-wise Euclidean distance metric between the high-dimensional representation of the background and incoming frame is performed, followed by a thresholding operation. FIGS. 7(a)-7(c) illustrate the foreground detection process. More specifically, FIG. 7(a) shows a video frame with a moving object 142; FIG. 7(b) shows the result of mapping performed by the color feature extraction module 124 on FIG. 7(a) into an 11-dimensional color representation, and FIG. 7(c) shows the corresponding binary foreground mask calculated by the foreground detection module 126.

As noted above, due to the time the model-based approaches take to adapt to the changing illumination conditions, a significant number of false positives are sometimes present in the modeled foreground mask. To the contrary, with the systems and methods herein, the false positives are kept to a minimum (because of the photometric invariance to illumination of the color space utilized) while still performing robust detection of foreground objects (because of the discriminability of the color space utilized). Therefore, the systems and methods herein are robust to illumination changes regardless of the rate at which they happen, use a smaller number of parameters that need to be tuned, do not require initialization or convergence time, and reduce the computational and memory requirements.

Figure 8:
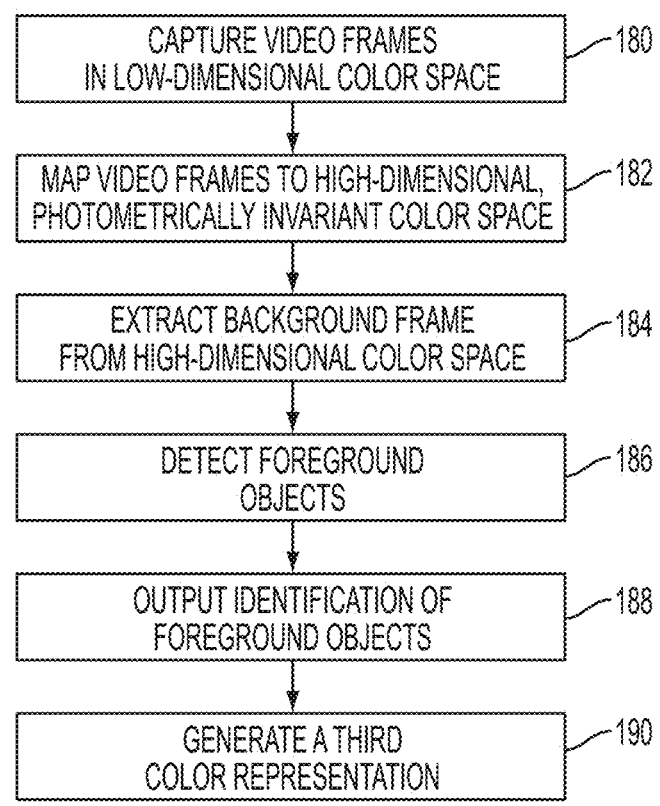
FIG. 8 is a flow diagram of various methods herein.

FIG. 8 is flowchart illustrating an exemplary method herein. In item 180, this method uses a camera in a fixed position to capture and output video of a scene being monitored. The video is output from the camera as a sequence of video frames having pixel values in a first (e.g., relatively low-dimensional) color space (e.g., three channel spaces such as RGB, YCbCr, YUV, Lab, and Luv, and four-channel spaces such as CMYK) where the first color space has a first (e.g., low) number of bits per channel or bit depth.

Also, in item 182, this exemplary method maps the video frames to a second (e.g., relatively higher-dimensional) color representation of video frames using an image-processing device operatively connected to the camera. For example, each pixel can be transformed to a higher-dimensional representation using a previously calculated look-up table (LUT), or other similar processing can be performed by the image processor to map the video frames (in a minimal processing time (e.g., in fractions of a second) without performing any modeling). Also, the mapping process can transform the pixel values in the first color space to be more photometrically invariant to illumination conditions.

The mapping process in item 182 transforms the pixel values in the first color space from the first number of bits per channel and a first number of channels (e.g., 8 or 16 bits per channel and 3 or 4 channels) to a second number of bits per channel and a second number of channels (e.g., 2, 4, etc., bits per channel and 8, 10, 12, etc. channels). Thus, the mapping process produces pixel values in the second color representation of video frames to be represented by vectors having a greater vector length (e.g., 8, 10 or 12 dimensions) relative to pixel values in the first color space (e.g., 2, 3 or 4 dimensions). This, therefore, causes the second color representation of video frames to have more color discrimination relative to the video frames having pixel values in the first color space.

Therefore, in item 182, the systems and methods herein transform the pixel values from a first color space (which has a relatively lower number of channels, and a given number of bits per channel or bit depth) into a second, higher-dimensional color space (which has a relatively greater number of channels, and possibly a different number of bits per channel or bit depth) in order to provide a color space that is both highly-discriminative, while at the same time being photometrically invariant to illumination.

In other words, in item 182, the mapping converts a densely populated (e.g., higher number of bits per channel or larger bit depth) low-dimensional (e.g., lower number of channels) color space and into a sparsely populated (e.g., lower number of bits per channel or smaller bit depth) high-dimensional (e.g., higher number of channels) color space. The increase in sparseness (e.g., because low-dimensional vectors are represented via high-dimensional vectors) leads to good discriminability between objects (i.e., a red object looks different than a blue object) without substantially reducing photometric invariance to illumination.

Thus, the second color space may have a smaller bit depth relative to the first color space; however, stated more generally, the second color space possibly has a different color bit depth relative to the first one (both smaller and greater).

In item 184, this exemplary method also produces (e.g., extracts) a second color representation of a background frame of the scene. The second color representation of a background frame can be produced by extracting the second color representation of a background frame from the second color space representation of incoming video frames, or the processing of the video frames can take place in the first color space, and then the resulting background image can be mapped to the second color space. More specifically, the process of extracting the second color representation of a background frame in item 184 can be performed by, for example, obtaining a frame of the second color representation of video frames when no foreground objects are present, filtering moving objects from the second color representation of video frames by identifying the moving objects as ones that change locations in adjacent frames of the second color representation of video frames, temporally averaging a number of incoming frames, temporally median filtering a number of incoming frames, etc. Since a representation of the background image in the second color space is desired, the processing of the video frames to extract the background image can be also performed in the first color space and the resulting background image then mapped to the second color space.

Then, in item 186, this method can detect foreground objects in a current frame of the second color representation of video frames by comparing the current frame with the second color representation of a background frame, again using the image-processing device. Finally, this exemplary method outputs an identification of the foreground objects in the current frame of the video from the image-processing device in item 188.

Additionally, in item 190, this exemplary method can generate a third color representation of the background frame and the video frames. The third color representation has a smaller number of channels and/or a smaller number of bits per channel relative to the second color representation. The third color representation can be obtained from the second color representation via a dimensionality reduction technique, and the third color representation preserves photometric invariance and discriminative attributes of the second color representation. Therefore, in item 190, if the use of a low-dimensional color space (e.g., third color representation) is desired, a mapping from the high-dimensional space to a low-dimensional space can be performed via dimensionality reduction techniques (e.g., linear dimensionality reduction techniques, such as principal component analysis or PCA and independent component analysis or ICA, non-linear dimensionality reduction techniques such as non-linear PCA and ICA, manifold learning, and principal curves, or quantization techniques such as scalar and vectorial quantization) provided the mapping largely preserves the features of the original space. The dimensionality reduction is such that the low-dimensional color space preserves most of the photometrically invariant and discriminative properties of the high-dimensional space.

Figure 9:
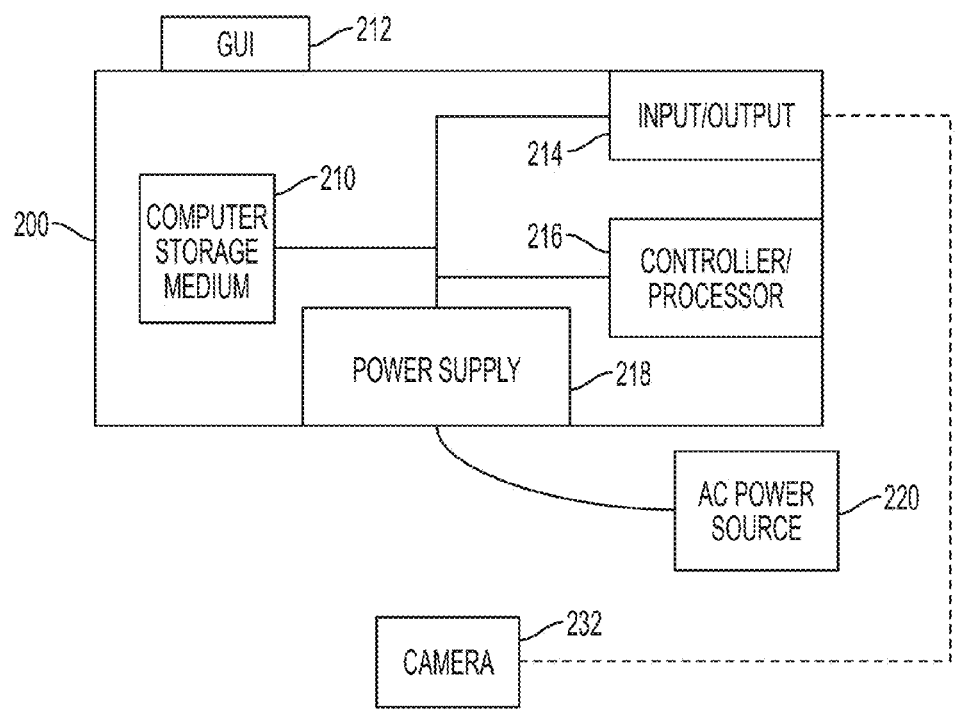
FIG. 9 is a schematic diagram illustrating systems herein.

FIG. 9 illustrates a computerized device 200, which can be used with systems and methods herein and can comprise, for example, an image processor, etc. The computerized device 200 includes a controller/tangible processor 216 and a communications port (input/output) 214 operatively connected to the tangible processor 216 and to a camera 232 on an external computerized network (external to the computerized device 200). Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

The image processor 200 shown in FIG. 9 is a special-purpose device distinguished from general-purpose computers because such a device include specialized hardware, such as: specialized processors 216 (e.g., containing specialized filters, buffers, application specific integrated circuits (ASICs), ports, etc.) that are specialized for image processing, etc.

Thus, exemplary system includes an image-processing device 200 and a camera 232 operatively (meaning directly or indirectly) connected to the image-processing device 200. The camera 232 is in a fixed position and outputs video of a scene being monitored. The camera 232 outputs the video as a sequence of video frames having pixel values in a first (e.g., relatively low dimensional) color space, where the first color space has a first number of bits per channel.

The image-processing device 200 maps the video frames to second (e.g., relatively higher dimensional) color representation of video frames. The mapping causes the second color representation of video frames to have a greater number of channels and possibly a different number of bits per channel relative to the first number of bits per channel. The mapping can also cause the second color representation of video frames to be more photometrically invariant to illumination conditions relative to the first color space. In one example, if the use a low-dimensional color space is desired, the image-processing device 200 can perform a mapping from the second, high-dimensional space to a third, low-dimensional space via traditional dimensionality reduction techniques (e.g., linear dimensionality reduction techniques such as principal component analysis or PCA and independent component analysis or ICA, non-linear dimensionality reduction techniques such as non-linear PCA and ICA, manifold learning, and principal curves, or quantization techniques such as scalar and vectorial quantization) provided the mapping largely preserves the features of the original space. Specifically, the dimensionality reduction is such that the low-dimensional color space preserves most of the photometrically invariant and discriminative properties of the high-dimensional space.

The first color space can be, for example, 3 or 4 dimensional color spaces (e.g., three-channel spaces such as RGB, YCbCr, YUV, Lab, Luv, and four-channel spaces such as CMYK, etc.) while the second color representation can have much higher dimensions, such as 11-dimensions or 11-channels (i.e., pixel values in the second color representation of video frames are represented by vectors have a greater vector length relative to pixel values in the first color space). The mapping is such that the second color representation of video frames has improved color discrimination and photometric invariance relative to the video frames having pixel values in the first color space.

The image-processing device 200 extracts a second color representation of a background frame of the scene from at least one of the second color representation of video frames. For example, the image-processing device 200 can extract the second color representation of a background frame by: obtaining a frame of the second color representation of video frames when no foreground objects are present; filtering moving objects from the second color representation of video frames by identifying the moving objects as ones that change locations in adjacent frames of the second color representation of video frames; temporally averaging a number of incoming frames; or temporally median filtering a number of incoming frames, etc. Since a representation of the background image in the second color space is desired, the processing of the video frames to extract the background image can alternatively be performed in the first color space and the resulting background image then mapped to the second color space.

The image-processing device 200 can then detect foreground objects in a current frame of the second color representation of video frames by comparing the current frame with the second color representation of a background frame. The image-processing device 200 then outputs an identification of the foreground objects in the current frame of the video.

The hardware described herein, such as the camera and video frame image processor, plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by human alone (or one operating with a pen and a pad of paper) and instead such processes can only be performed by a machine. Specifically, processes such as obtaining videos, processing and analyzing video frames on a pixel-by-pixel basis, etc., requires the utilization of different specialized machines. Therefore, for example, the processing of video frames performed by the systems and methods herein cannot be performed manually (because it would take decades or lifetimes to perform the mathematical calculations for all pixels involved, that are performed in seconds or fractions of a second by devices herein) and the devices described herein are integral with the processes performed by methods herein. Further, such machine-only processes are not mere "post-solution activity" because the digital images obtained by the camera and the pixel processing on the video frames are integral to the methods herein. Similarly, the electronic transmissions between the camera and image processor utilize special-purpose equipment (telecommunications equipment, routers, switches, etc.) that are distinct from a general-purpose processor.

The methods herein additionally solve many technological problems related to object detection in video frames. Foreground and moving object detection is a precursor of video-based object tracking, and, as such, is one of the technical problems in computer vision applications such as surveillance, traffic monitoring and traffic law enforcement, etc. By identifying foreground objects using unmodeled processing (which is more robust and utilizes less hardware resources) the systems and methods herein provide many substantial technological benefits.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. Further, the terms automated or automatically mean that once a process is started (by a machine or a user), one or more machines perform the process without further input from any user.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
   an image-processing device; and
   a camera operatively connected to said image-processing device,
   said camera outputting video of a scene being monitored and being in a fixed position relative to said scene,
   said camera outputting said video as a sequence of video frames having pixel values in a first color space,
   said first color space having a first number of channels,
   said image-processing device mapping said video frames to a second color representation of video frames,
   said second color representation of video frames having a larger second number of channels relative to said first number of channels,
   said image-processing device producing a second color representation of a background frame of the scene,
   said image-processing device detecting at least one foreground object in a current frame of video frames by comparing said second color representation of said current frame with said second color representation of said background frame, and
   said image-processing device outputting an identification of said at least one foreground object in said current frame of said video.

2. The system according to claim 1, said second color representation of video frames having more color discrimination relative to said video frames having pixel values in said first color space.

3. The system according to claim 1, pixel values in said second color representation of video frames being represented by vectors having a greater vector length relative to pixel values in said first color space.

4. The system according to claim 1, said image-processing device extracting said second color representation of a background frame by:
   obtaining a frame of said second color representation of video frames when no foreground objects are present;

filtering moving objects from said second color representation of video frames by identifying said moving objects as ones that change locations in adjacent frames of said second color representation of video frames;
temporally averaging a number of incoming frames; or
temporally median filtering a number of incoming frames.

5. The system according to claim 1, said image-processing device generating a third color representation for a third color representation of a background frame and said video frames,
   said third color representation having at least one of a smaller number of channels and a smaller bit depth relative to the second color representation,
   said third color representation being obtained via a dimensionality reduction technique, and
   said third color representation preserves photometric invariance and discriminative attributes of the second color representation.

6. A system comprising:
an image-processing device; and
a camera operatively connected to said image-processing device,
said camera outputting video of a scene being monitored and being in a fixed position relative to said scene,
said camera outputting said video as a sequence of video frames having pixel values in a first color space,
said first color space having a first number of channels and a first number of bits per channel,
said image-processing device mapping said video frames to a second color representation of video frames,
said second color representation of video frames having a larger second number of channels relative to said first number of channels, and a different second number of bits per channel relative to said first number of bits per channel,
said image-processing device producing a second color representation of a background frame of the scene,
said image-processing device detecting at least one foreground object in a current frame of video frames by comparing said second color representation of said current frame with said second color representation of said background frame, and
said image-processing device outputting an identification of said at least one foreground object in said current frame of said video.

7. The system according to claim 6, said second color representation of video frames having more color discrimination relative to said video frames having pixel values in said first color space.

8. The system according to claim 6, pixel values in said second color representation of video frames being represented by vectors having a greater vector length relative to pixel values in said first color space.

9. The system according to claim 6, said image-processing device extracting said second color representation of a background frame by:
   obtaining a frame of said second color representation of video frames when no foreground objects are present;
   filtering moving objects from said second color representation of video frames by identifying said moving objects as ones that change locations in adjacent frames of said second color representation of video frames;
   temporally averaging a number of incoming frames; or
   temporally median filtering a number of incoming frames.

10. The system according to claim 6, said image-processing device generating a third color representation for a third color representation of a background frame and said video frames,
   said third color representation having at least one of a smaller number of channels and a smaller bit depth relative to the second color representation,
   said third color representation being obtained via a dimensionality reduction technique, and
   said third color representation preserves photometric invariance and discriminative attributes of the second color representation.

11. A method comprising:
outputting video of a scene being monitored using a camera in a fixed position, said outputting said video comprising outputting a sequence of video frames having pixel values in a first color space, and said first color space having a first number of channels;
mapping said video frames to a second color representation of video frames using an image-processing device operatively connected to said camera, said mapping transforming said pixel values in said first color space from said first number of channels to a greater second number of channels;
producing a second color representation of a background frame of the scene using said image-processing device;
detecting at least one foreground object in a current frame of said second color representation of video frames by comparing said current frame with said second color representation of said background frame using said image-processing device; and
outputting an identification of said at least one foreground object in said current frame of said video from said image-processing device.

12. The method according to claim 11, said second color representation of video frames having more color discrimination relative to said video frames having pixel values in said first color space.

13. The method according to claim 11, pixel values in said second color representation of video frames being represented by vectors having a greater vector length relative to pixel values in said first color space.

14. The method according to claim 11, said extracting said second color representation of a background frame comprising:
   obtaining a frame of said second color representation of video frames when no foreground objects are present;
   filtering moving objects from said second color representation of video frames by identifying said moving objects as ones that change locations in adjacent frames of said second color representation of video frames;
   temporally averaging a number of incoming frames; or
   temporally median filtering a number of incoming frames.

15. The method according to claim 11, further comprising generating a third color representation for a third color representation of a background frame and said video frames,
   said third color representation having at least one of a smaller number of channels and a smaller bit depth relative to the second color representation,
   said third color representation being obtained via a dimensionality reduction technique, and
   said third color representation preserves photometric invariance and discriminative attributes of the second color representation.

16. A method comprising:
outputting video of a scene being monitored using a camera in a fixed position, said outputting said video comprising outputting a sequence of video frames having pixel values in a first color space, and said first color space having a first number of channels and a first number of bits per channel;

mapping said video frames to a second color representation of video frames using an image-processing device operatively connected to said camera, said mapping transforming said pixel values in said first color space from said first number of channels to a greater second number of channels having a different second number of bits per channel;

producing a second color representation of a background frame of the scene using said image-processing device;

detecting at least one foreground object in a current frame of said second color representation of video frames by comparing said current frame with said second color representation of the background frame using said image-processing device; and outputting an identification of said at least one foreground object in said current frame of said video from said image-processing device.

17. The method according to claim 16, said second color representation of video frames having more color discrimination relative to said video frames having pixel values in said first color space.

18. The method according to claim 16, pixel values in said second color representation of video frames being represented by vectors having a greater vector length relative to pixel values in said first color space.

19. The method according to claim 16, said extracting said second color representation of a background frame comprising:

obtaining a frame of said second color representation of video frames when no foreground objects are present;

filtering moving objects from said second color representation of video frames by identifying said moving objects as ones that change locations in adjacent frames of said second color representation of video frames;

temporally averaging a number of incoming frames; or temporally median filtering a number of incoming frames.

20. The method according to claim 16, further comprising generating a third color representation for a third color representation of a background frame and said video frames, said third color representation having at least one of a smaller number of channels and a smaller bit depth relative to the second color representation, said third color representation being obtained via a dimensionality reduction technique, and said third color representation preserves photometric invariance and discriminative attributes of the second color representation.

* * * * *